United States Patent [19]
Gertel et al.

[11] Patent Number: 5,962,104
[45] Date of Patent: Oct. 5, 1999

[54] OPTICAL TABLE

[75] Inventors: Maurice Gertel, Chestnut Hill; Hamid Shaidani, Randolph; Steven F. Shedd, Plympton, all of Mass.

[73] Assignee: Kinetic Systems, Inc., Roslindale, Mass.

[21] Appl. No.: 08/848,827

[22] Filed: May 1, 1997

[51] Int. Cl.[6] .................................................. B32B 3/12
[52] U.S. Cl. .......................... 428/116; 428/118; 428/131; 428/138
[58] Field of Search .................... 428/116, 118, 428/131, 138

[56] References Cited

U.S. PATENT DOCUMENTS

| | | | |
|---|---|---|---|
| 4,157,802 | 6/1979 | May, Jr. ................................. | 428/116 |
| 4,621,006 | 11/1986 | Terry et al. ........................... | 428/131 X |
| 4,853,065 | 8/1989 | Terry et al. ........................... | 428/116 X |
| 5,021,282 | 6/1991 | Terry et al. ........................... | 428/131 X |
| 5,061,541 | 10/1991 | Gertel .................................... | 428/131 X |
| 5,154,963 | 10/1992 | Terry .................................... | 428/116 |
| 5,402,734 | 4/1995 | Galpin et al. ........................ | 428/116 X |
| 5,500,269 | 3/1996 | Terry .................................... | 428/131 X |

*Primary Examiner*—Henry F. Epstein
*Attorney, Agent, or Firm*—Iandiorio & Teska

[57] ABSTRACT

An optical table including a top facing sheet with apertures therethrough for supporting components on the top facing sheet, a bottom facing sheet spaced from the top facing sheet, and a panel under the top facing sheet including upstanding ribs defining channels between the ribs on one surface of the panel wherein the ribs support the top facing sheet and the channels are located beneath the apertures in the top facing sheet for capturing spills through the apertures in the top facing sheet.

26 Claims, 4 Drawing Sheets

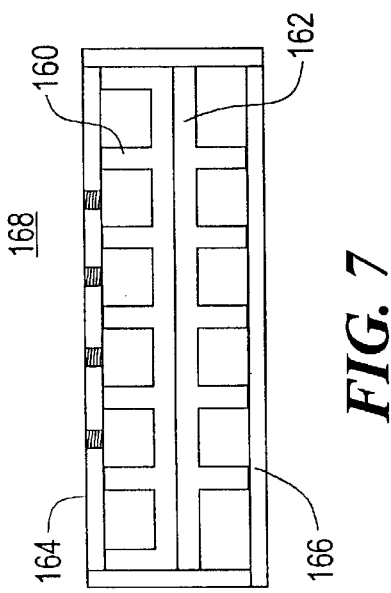
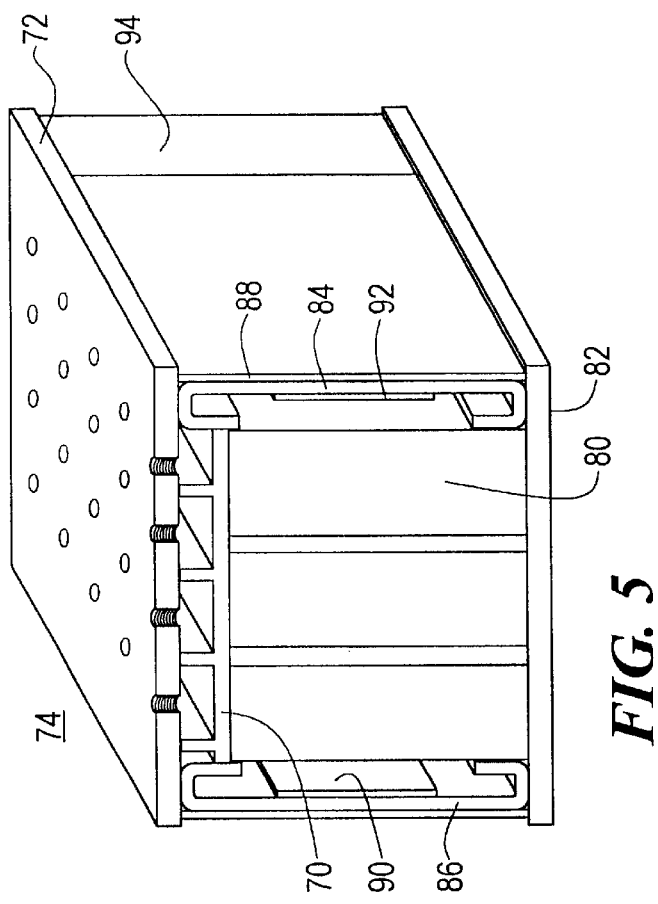
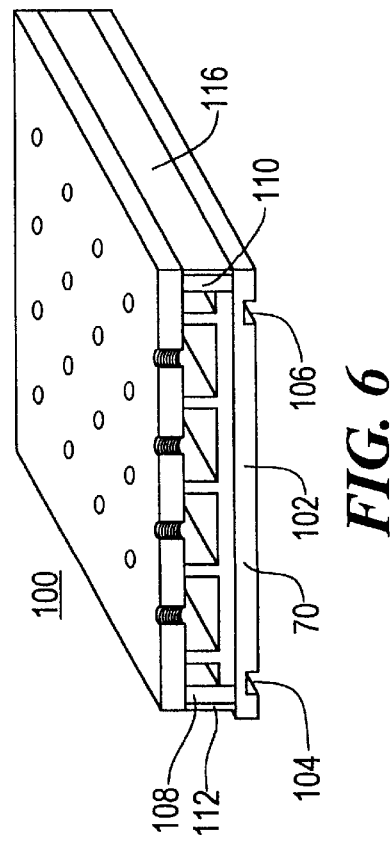

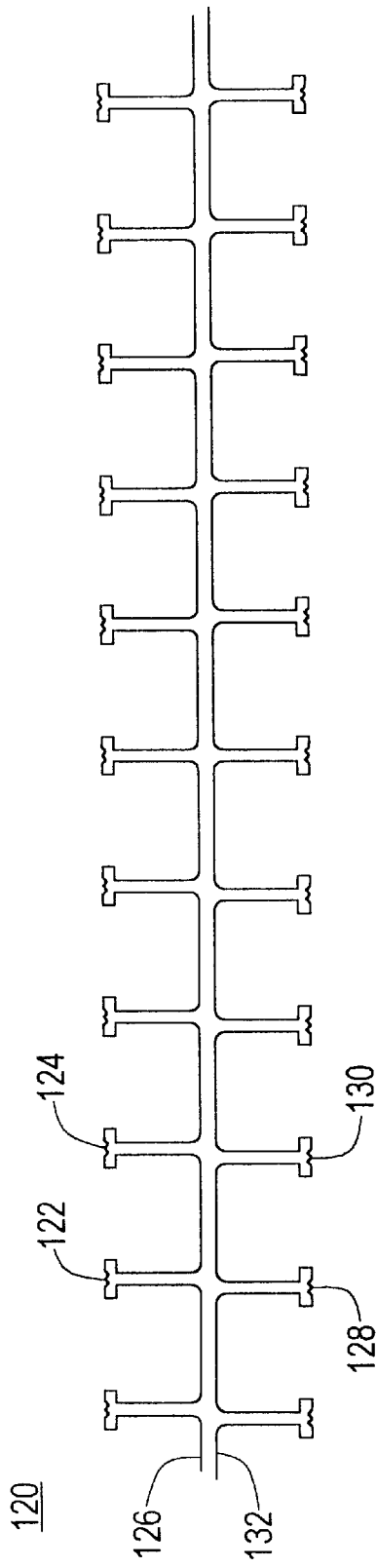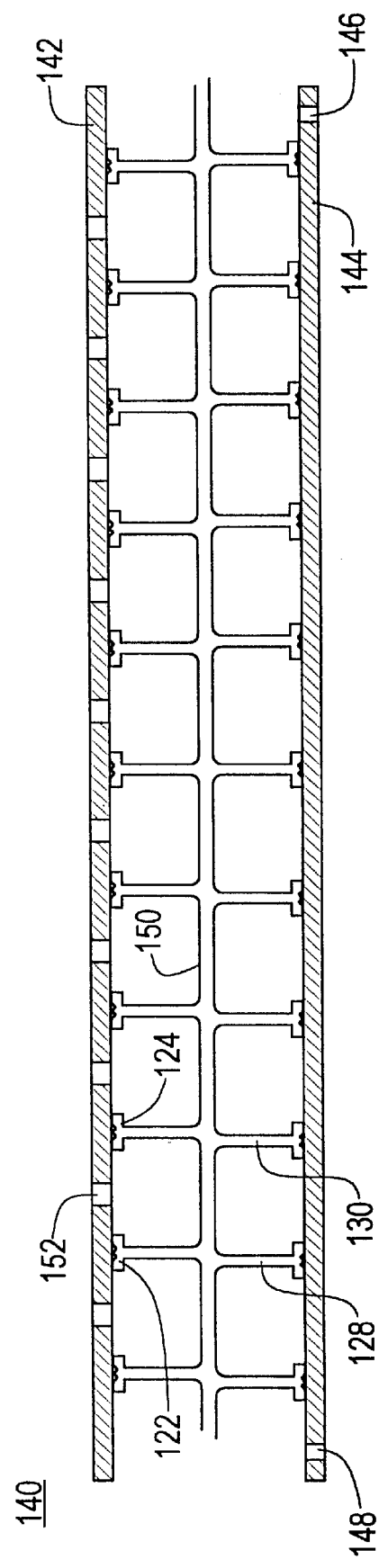

OPTICAL TABLE

FIELD OF INVENTION

This invention relates to an improved optical table and table structure.

BACKGROUND OF INVENTION

Optical tables are used for supporting optical and other analytical devices, for example lasers, that must be mounted on extremely rigid flat surfaces. Bending or twisting of the surface of the table must be minimized in order to minimize displacement of the devices relative to one another.

Historically, granite slabs have been used as optical tables. While these tables provide flatness and rigidity required in an optical table, their great weight and the difficulty of attaching components to their surfaces make them cumbersome to use.

Modern optical tables are generally of composite construction consisting relatively thin upper and lower metallic skins bonded to central honeycomb core which is enclosed by a surrounding sidewall. Typically, the top surface or skin of a honeycomb optical table is furnished with a regular array of threaded mounting holes to permit the secure attachment of optical fixtures and related devices to the table top. The cost of such composite construction optical tables can be thousands of dollars. When laser dyes, oils, coolants, beverage spills, and other debris enter the interior honeycomb core section of such an optical table through the apertured table top, the result can be disastrous. Because of the bonded construction of such honeycomb tables, they can not be disassembled for cleaning. Liquids, vapors, and particles that enter the interior of the table during manufacture or later use can also escape rendering the optical table incompatible with clean room requirements.

There are various prior art methods of constructing honeycomb core optical tables which limit the entry of contaminates into the interior honeycomb core of the optical table.

For example, the optical table shown in FIG. 1A is disclosed in U.S. Pat. No. 5,154,963. Flat sealing sheet 10, FIGS. 1A and 1B, separate honeycomb core section 12 from honeycomb core section 14 and thus any contaminates spilled through aperture 16 in top table leaf 18 will be sealed off from honeycomb core section 14 via sealing sheet 10. One problem with such a structure is the requirement of two honeycomb core sections 12 and 14, the addition of sealing sheet 10, and the manufacturing inconveniences associated with the same.

The honeycomb table construction shown in FIG. 2A, disclosed in U.S. Pat. No. 5,061,541, includes corrugated sheet 20, FIGS. 2A and 2B, which seals orifices 16 in table top 18 with respect to honeycomb core 14. Stiffening sheet 22, adjacent to corrugated sheet 20, is required in the preferred embodiment for structural rigidity. Again, the inconvenience of properly orienting and assembling corrugated sheet 20 and the need for stiffening sheet 22 can be disadvantageous.

The optical table shown in FIG. 3A is disclosed in detail in U.S. Pat. Nos. 5,021,282 and 4,853,965. Sealing sheet 30, FIGS. 3A and 3B, includes a number of downward projections such as projection 32 which individually seals each cavity of honeycomb core 14 with respect to orifices 16 in table leaf 18. In this design, the complexity of stamping or vacuum forming sealing sheet 30 as well as the difficultly of manufacturing an optical table including such a sealing sheet renders the design less than desirable. In addition, to clean such an optical table, each honeycomb cavity must be individually cleaned using a vacuum line connected to each aperture in the table leaf.

SUMMARY OF INVENTION

It is therefore an object of this invention to provide an improved optical table.

It is a further object of this invention to provide an improved table structure.

It is a further object of this invention to provide such an improved optical table and table structure which eliminates the need for stiffening sheets.

It is a further object of this invention to provide such an improved optical table which is easier to manufacture.

It is a further object of this invention to provide an improved optical table which is easier to clean and keep clean.

It is a further object of this invention to provide such an optical table which may, depending on the specific type of optical table desired, include a honeycomb core or, in a simpler design, a ribbed panel design.

This invention results from the realization that the inconvenience of assembling an apertured top honeycomb table with a corrugated sheet and a stiffening sheet or individual cups to capture spills through the apertures and the difficulty of cleaning such a table can be reduced by fabricating a rigid ribbed panel, the ribs of which support the top sheet thus eliminating the need for a corrugated sheet, a stiffening sheet, or cups, while still assuring that spills through the top sheet apertures are caught by the channels between the ribs.

This invention results from the further realization that in some cases, the honeycomb core can be eliminated all together and the bottom sheet affixed directly to the ribbed panel.

This invention results from the realization that in other cases, a panel with two sets of opposing but differently spaced ribs on each side of the panel can be used in tables fabricated both according to the metric and English system of units and also that one set of ribs can be used to support the table top and the other set of ribs used to support the table bottom thus eliminating the need for a honeycomb core.

This invention features an optical table. There is a top facing sheet with apertures through the top facing sheet for supporting components on the top of the top facing sheet. There is also a bottom facing sheet spaced from the top facing sheet. A unique panel under the top facing sheet includes upstanding ribs defining channels between the ribs on one surface of the panel. This panel is located under the top facing sheet such that the ribs support the top facing sheet. The channels are located beneath the apertures in the top facing sheet to capture anything spilled through the apertures in the top facing sheet. The ribs preferably extend continuously along the length of the panel.

In one embodiment, there is a honeycomb core which extends between this panel and the bottom facing sheet. In another embodiment, however, the bottom sheet is disposed directly beneath the panel. In still another embodiment, the panel also includes a set of ribs on an opposing surface of the panel extending in a direction opposite the upstanding ribs. Such a panel may be monolithic or a two piece design with two separate panels secured back to back to each other. In this embodiment, the spacing between the upstanding ribs is in one system of units, for example, English inch units, and the spacing between the opposing set of ribs is in another set of units, for example metric millimeter units. The bottom facing sheet is then disposed directly against the opposing set of ribs.

The panels preferably have one raised edge portion for receiving and sealingly overlapping an edge of an adjacent panel. The panels are typically made of a rigid extruded aluminum material. Also, the top surface of the ribs include a groove or grooves therein for receiving the adhesive used to secure the components of the optical table together.

Such optical tables typically include opposing sidewalls disposed between the top and bottom facing sheets. In one embodiment, the sidewalls are C-shaped channel members. The sidewalls may include damping members disposed on an interior side of the sidewall and a decorative laminate on the outside of the sidewall.

In a broader sense, the invention of this application includes any structure with a top facing sheet and a bottom facing sheet spaced from the top facing sheet. There is a unique panel under the top facing sheet including upstanding ribs defining channels between the ribs on one surface of the panel, the ribs supporting the top facing sheet. In the optical table embodiment, the top facing sheet typically includes a plurality of apertures and the channels of the panel are located beneath these apertures. In one embodiment, there is a honeycomb core extending between the panel and the bottom facing sheet. In another embodiment, the bottom sheet is disposed directly underneath the panel. In either case, the panel may further include a set of ribs on an opposing surface of the panel extending in a direction opposite the upstanding ribs. The spacing between the upstanding ribs is preferably one of English and metric units and the spacing between the opposing ribs is the other of the English and metric units.

BRIEF DESCRIPTION OF THE DRAWINGS

Other objects, features and advantages will occur to those skilled in the art from the following description of a preferred embodiment and the accompanying drawings, in which:

FIG. 5 is a schematic view of one embodiment of a honeycomb core optical table incorporating the ribbed panel shown in FIG. 4;

FIG. 6 is a schematic view of another embodiment of an optical table in accordance with the subject invention;

FIG. 7 is a front cut away view of another embodiment of an optical table in accordance with this invention;

FIG. 8 is a front view of another embodiment of the ribbed panel in accordance with the subject invention; and FIG. 9 is a front cut away view of an optical table in accordance with the subject invention incorporating the ribbed panel shown in FIG. 7.

DISCLOSURE OF THE PREFERRED EMBODIMENT

Figure 4:
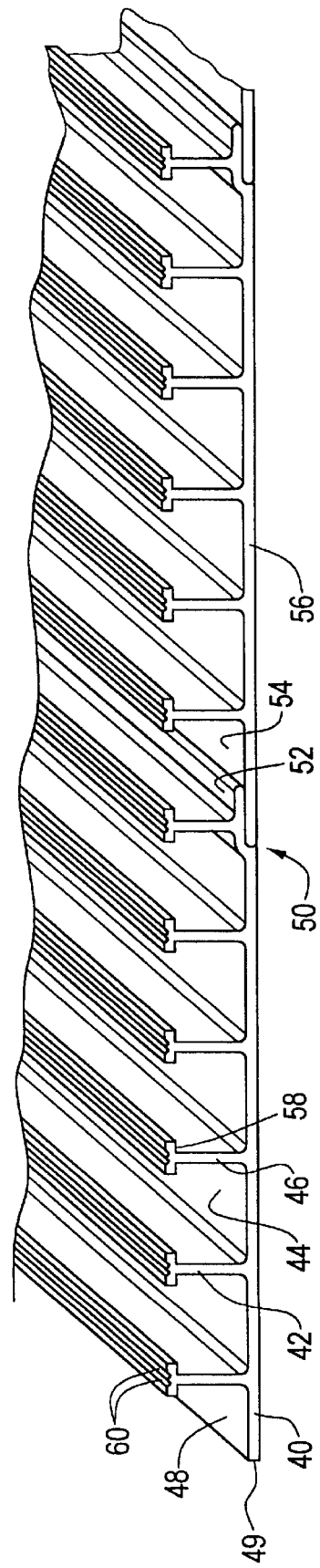
FIG. 4 is a schematic view of the ribbed panel used as the sealing sheet in accordance with the subject invention.

Ribbed panel 40, FIG. 4 is used as a sealing sheet and also as the supporting structure of a number of different types of optical tables in accordance with the subject invention. Panel 40 includes a plurality of upstanding ribs 42, 46 defining channels therebetween as shown for channel 44 between ribs 42 and 46 on surface 48 of panel 40. In a preferred embodiment, ribs 42 and 46 extend continually along the length of panel 40. Such a panel may be extruded aluminum 12 inches wide by 16 feet long and cut to the appropriate size during construction of the optical table. Adjacent panels 40 and 56 are sealingly interlocked as shown at 50 via raised edge portion 52 of panel 40 which rests on surface 54 of adjacent panel 56. Each rib is approximately 0.51 inches high and approximately 0.30 inches wide at top surface 58 as shown for rib 46. Top surface 58 typically includes one or more grooves as shown at 60 for receiving the adhesive used in the manufacturing process to secure the table top to the ribs. The thickness of body 49 of panel 40 is typically 0.125 inches. The spacing between adjacent ribs 42 and 46 is typically 1.00 inches or 25 millimeters depending on the spacing of the apertures in the optical table top surface.

In one embodiment, one or more such panels 40, 56, FIG. 4 are assembled together to form ribbed panel structure 70, FIG. 5 directly underneath and supporting top apertured facing sheet 72 of optical table 74. As shown, the ribs of panel 70 support top facing sheet 72, and the channels in ribbed panel 70 correspond to the spacing of the apertures in the top facing sheet. Thus, the channels run directly underneath the apertures to catch spills through the apertures.

Honeycomb core 80 extends between panel 70 and bottom facing sheet 82. Preferably, honeycomb core 80 is in direct communication and therefore supports panel 70. An additional stiffening sheet is not required. Sidewalls 84 and 86 are formed of C-shaped carbon steel channels surrounded by decorative laminate 88 such as a Formica material. Damping members 90 and 92 may be adhered to the interior portions of the C-shaped sidewalls. Damping members 90 and 92 may be thin 1/32 inch thick pieces of sheet metal. Damping members 90 and 92 typically cover 50–60% of the interior of the sidewalls. For example, they are 2" high on a 4" panel. All of these structures are typically secured to each other with an epoxy such as 3M's #2216 epoxy. A tape (not shown) and/or epoxy is used to secure damping members 90 and 92 to the interior of the sidewalls. Corner member 94, which wraps around each of the four corners of optical table 74, is a thin piece of chromed or polished steel for decorative purposes.

Such optical tables are typically anywhere from between 2 inches to 24 inches thick and anywhere from 1 foot by 1 foot in area to 6 feet by 16 feet in area. Accordingly, the number and size of the individual ribbed panels used in the different types of optical tables will vary according to their size and construction.

In another type of optical table in accordance with the subject invention, there is no honeycomb core. As shown for optical table 100, FIG. 6, bottom facing sheet 102 is disclosed directly beneath ribbed panel 70. Such optical tables are typically 7/8 inches to 1 inch thick and have a surface area of 12 inches by 12 inches to 24 inches by 36 inches. Orifices 104 and 106 in bottom facing sheet 102 may be used to receive leg members as appropriate. Sidewalls 108 and 110 are covered in a decorative Formica laminate material 112 and 116 and are usually formed of blocks of particle board.

Optical table 168, FIG. 7 includes two ribbed panels 160 and 162 secured back to back as shown between and supporting top apertured sheet 164 and bottom sheet 166. Ribbed panels 160 and 162 are secured to each other by epoxy, rivets or other fasteners, and/or a double sided tape for damping. In this embodiment, the resulting panel includes both upstanding ribs and a set of ribs extending in the opposite direction from the upstanding ribs as shown.

In another embodiment, such a dual ribbed panel is designed as shown in FIG. 8. Monolithic panel 120 includes upstanding ribs 122, 124, etc. on surface 126 of panel 120 and opposing ribs 128 and 130 etc. on surface 132 of panel 120. In the preferred embodiment, the spacing between ribs 122 and 124 is in English inch units while the spacing between ribs 128 and 130 is in metric millimeter units and thus, depending on its orientation, panel 120 can be used with face sheets including apertures drilled and tapped in inch or metric units as desired. Typically, ribs 122 and 124 are spaced apart by a distance of approximately 1 inch from the centerlines thereof and ribs 128 and 130 are spaced apart a distance of approximately 25 millimeters from the centerlines thereof. The distance from the top surface of rib 128 to the top surface of rib 122 is approximately 1.625 inches.

Although this construction of the rib panel may be used in optical table 74, FIG. 5 and/or optical table 100, FIG. 6, and/or optical table 168, FIG. 7, it is preferably used in conjunction with optical table 140, FIG. 9 wherein upstanding ribs 122 and 124 support apertured table leaf 142 and opposing ribs 128 and 130 are disposed directly against bottom facing sheet 144 which includes orifices 146 and 148 for receiving leg members or the like. Note that channel 150 between upstanding ribs 122 and 124 will catch any liquid or particulate matter spilled through aperture 152 of top facing sheet 142.

Figure 1B:
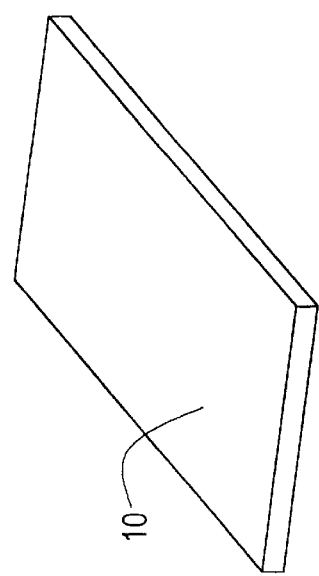
FIG. 1B is a schematic view of the sealing sheet used in the honeycomb table shown in FIG. 1A.
Figure 2B:
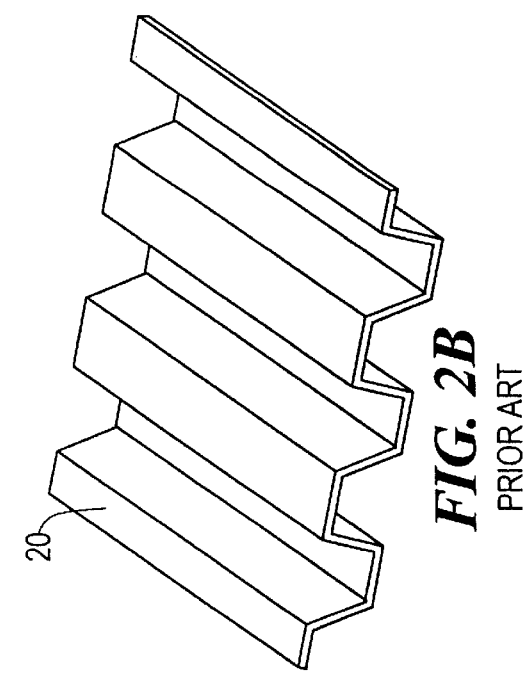
FIG. 2B is a schematic view of the rigid corrugated sheet shown in FIG. 2A.
Figure 1A:
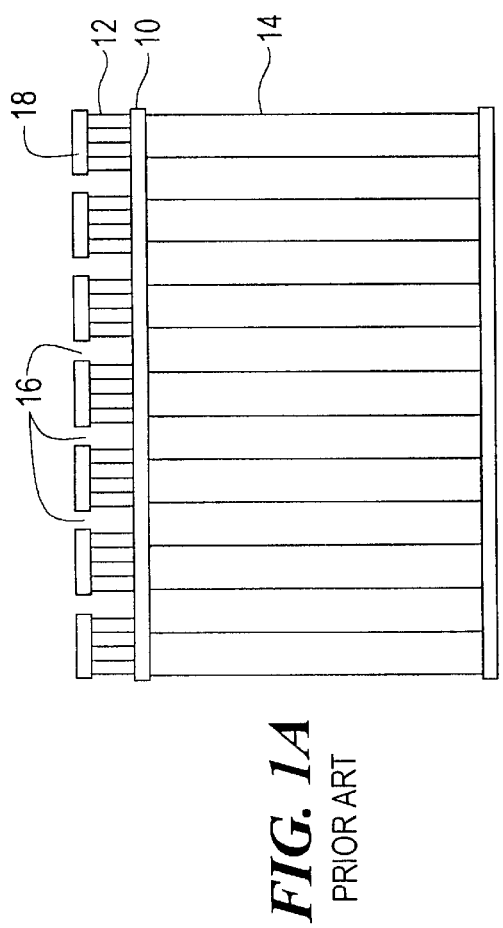
FIG. 1A is a front cutaway view of a prior art honeycomb table which employs a sealing sheet.
Figure 2A:
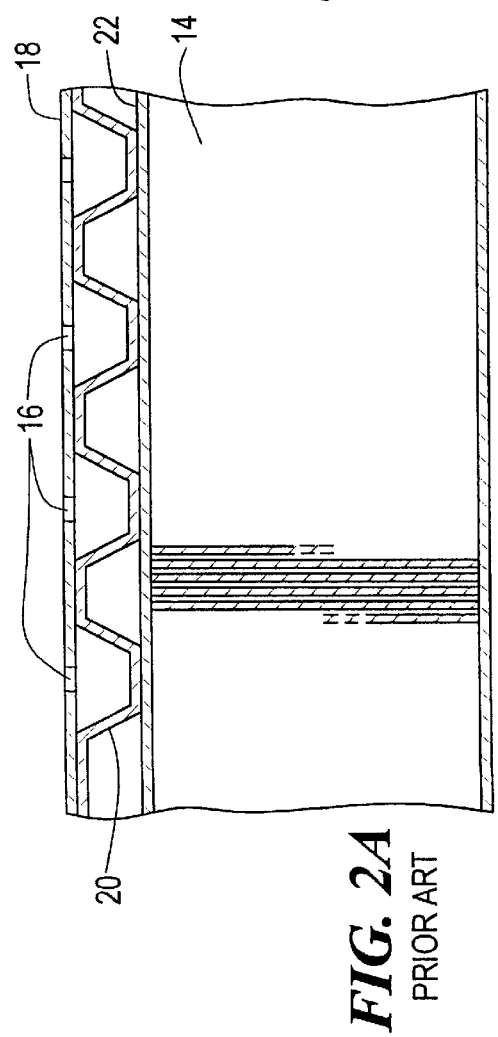
FIG. 2A is a front sectional view of another prior art honeycomb table which uses a corrugated sealing sheet and an adjacent stiffening sheet.
Figure 3B:
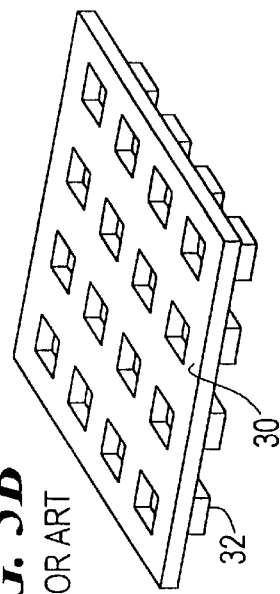
FIG. 3B is a schematic view of the sealing sheet used in the prior art optical table shown in FIG. 3A.

The rigid nature of panel 40, FIG. 4 and panel 120, FIG. 8 facilitates the construction of optical tables and other types of tables and structures and eliminates the disadvantages associated with the required special handling of corrugated sheets such as the corrugated sheet 20 shown in FIG. 2B and the cup like sheet 30, FIG. 3B associated with the prior art. Moreover, panel 40, FIG. 4 and panel 120, FIG. 8 eliminate the need for an additional honeycomb core section 12, FIG. 1A as is required in the prior art and also eliminates stiffening sheet 22, FIG. 2A required in the preferred embodiment of the prior art.

Figure 3A:
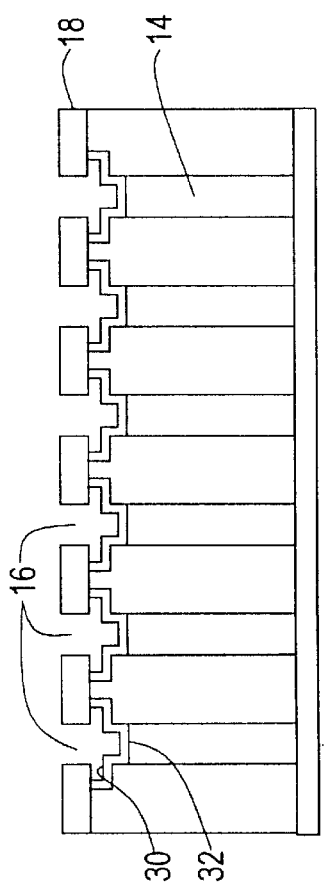
FIG. 3A is a front cutaway view of still another prior art optical honeycomb table which employs a sealing sheet including a number of cups or projections.

Finally, cleaning of optical tables 74, FIG. 5; 100, FIG. 6; 168, FIG. 7; and 140, FIG. 9 including the ribbed sealing panel of this invention is much easier than the cleaning procedure associated with prior art optical tables. For example, in order to properly clean the optical table disclosed in U.S. Pat. No. 4,853,165 (FIG. 3A), a vacuum line must be hooked up to each individual aperture in the top table leaf.

In the invention disclosed herein, in sharp contrast, the optical table is simply tilted in the direction of the channels so that all foreign matter runs in the channels down to the end of the table which is then cleaned via the apertures only at the very end of the table. Preferably, the channels in ribbed panel 40, FIG. 4 run in the direction of the length of the optical table for tables up to 12' long. For tables greater than 12' in length, the ribbed panels may be oriented so that the channels run the width of the table for easier manufacturing and handling of the ribbed panels. Note that although the ribbed panel is used in conjunction with optical tables in the preferred embodiment, it may be used in association with other types of composite tables and corresponding structures.

Although specific features of this invention are shown in some drawings and not others, this is for convenience only as each feature may be combined with any or all of the other features in accordance with the invention.

Other embodiments will occur to those skilled in the art and are within the following claims:

What is claimed is:

1. An optical table comprising:
   a top facing sheet with apertures therethrough for supporting components on said top facing sheet;
   a bottom facing sheet spaced from said top facing sheet; and
   a panel under said top facing sheet including upstanding ribs defining channels between the ribs on one surface of the panel, the ribs supporting the top facing sheet, the channels located beneath said apertures in said top facing sheet.

2. The optical table of claim 1 in which said ribs extend continuously along the panel.

3. The optical table of claim 1 further including a honeycomb core extending between said panel and said bottom facing sheet.

4. The optical table of claim 3 in which said honeycomb core is in direct communication with said panel.

5. The optical table of claim 1 in which said bottom sheet is disposed directly beneath said panel.

6. The optical table of claim 1 in which said panel further includes a set of ribs on an opposing surface of the panel extending in a direction opposite the upstanding ribs.

7. The optical table of claim 6 in which the spacing between said upstanding ribs is one of English inch and metric millimeter units, and the spacing between the set of opposing ribs is the other of the English inch and metric millimeter units.

8. The optical table of claim 6 in which said opposing set of ribs are disposed directly against the bottom facing sheet.

9. The optical table of claim 1 in which said panel includes a plurality of adjacently disposed sections, at least one said panel including a raised edge portion for receiving and sealingly overlapping an edge of an adjacent panel.

10. The optical table of claim 1 in which said panel is rigid.

11. The optical table of claim 1 in which said panel is made of extruded aluminum.

12. The optical table of claim 1 in which a top surface of said ribs includes a groove therein.

13. An optical table comprising:
    a top facing sheet with apertures therethrough for supporting components on said top facing sheet;
    a bottom facing sheet spaced from said top facing sheet;
    a panel under said top facing sheet including upstanding ribs defining channels between the ribs on one surface of the panel, the ribs supporting the top facing sheet, the channels located beneath said apertures in said top facing sheet; and
    a honeycomb core extending between said panel and said bottom facing sheet.

14. The optical table of claim 13 in which said ribs extend continuously along the panel.

15. The optical table of claim 13 in which said table further includes opposing sidewalls disposed between said top and bottom facing sheets.

16. The optical table of claim 15 in which said sidewalls are C-shaped channel members.

17. The optical table of claim 15 in which at least one said sidewall includes a damping member disposed thereon facing the interior of the table.

18. The optical table of claim 15 further including a decorative laminate disposed on the outside of said opposing sidewalls.

19. The optical table of claim 13 in which a top surface of said ribs includes a groove therein.

20. An optical table comprising:
 a top facing sheet with apertures therethrough for supporting components on said top facing sheet;
 a panel under said top facing sheet including upstanding ribs defining channels between the ribs on one surface of the panel, the ribs supporting the top facing sheet, the channels located beneath said apertures in said top facing sheet; and
 a bottom facing sheet disposed directly beneath said panel.

21. The optical table of claim 20 further including opposing sidewalls disposed between said top and bottom face sheets.

22. The optical table of claim 20 in which a top surface of said ribs includes a groove therein.

23. An optical table comprising:
 a top facing sheet with apertures therethrough for supporting components on said top facing sheet;
 a bottom facing sheet spaced from said top facing sheet;
 a panel under said top facing sheet including upstanding ribs defining channels between the ribs on one surface of the panel, the ribs supporting the top facing sheet, the channels located beneath said apertures in said top facing sheet, said panel further including a set of ribs on an opposing surface of the panel extending in a direction opposite the upstanding ribs.

24. The optical table of claim 23 in which said opposing set of ribs are disposed against the bottom facing sheet.

25. The optical table of claim 23 in which a top surface of said upstanding ribs includes a groove therein.

26. The optical table of claim 23 in which the spacing between said upstanding ribs is one of English inch and metric millimeter units, and the spacing between the set of opposing ribs is the other of the English inch and metric millimeter units.

* * * * *